(12) United States Patent
Rasmussen et al.

(10) Patent No.: US 7,730,389 B2
(45) Date of Patent: Jun. 1, 2010

(54) SYSTEM FOR AUTOMATICALLY INTEGRATING A DIGITAL MAP SYSTEM

(75) Inventors: Lars Eilstrup Rasmussen, Berkeley, CA (US); Jens Eilstrup Rasmussen, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 10/995,629

(22) Filed: Nov. 22, 2004

(65) Prior Publication Data

US 2005/0119824 A1 Jun. 2, 2005

Related U.S. Application Data

(60) Provisional application No. 60/525,420, filed on Nov. 25, 2003.

(51) Int. Cl.
*G06F 17/00* (2006.01)

(52) U.S. Cl. .................. 715/208; 715/234; 715/760

(58) Field of Classification Search .......... 715/501.1, 715/513, 760, 208, 234
See application file for complete search history.

(56) References Cited

U.S. PATENT DOCUMENTS

| 6,122,647 | A * | 9/2000 | Horowitz et al. ............ 715/205 |
| 6,598,027 | B1 | 7/2003 | Breen, Jr. et al. |
| 6,623,527 | B1 * | 9/2003 | Hamzy ...................... 715/234 |
| 6,623,529 | B1 * | 9/2003 | Lakritz ..................... 715/205 |
| 6,724,382 | B2 | 4/2004 | Kenyon et al. |
| 6,993,502 | B1 * | 1/2006 | Gryglewicz et al. .......... 705/31 |
| 7,003,522 | B1 * | 2/2006 | Reynar et al. ............... 707/10 |
| 2002/0007309 | A1 * | 1/2002 | Reynar ....................... 705/14 |
| 2002/0067353 | A1 | 6/2002 | Kenyon et al. |
| 2002/0067374 | A1 | 6/2002 | Kenyon |
| 2002/0067379 | A1 | 6/2002 | Kenyon et al. |
| 2002/0107735 | A1 * | 8/2002 | Henkin et al. ............... 705/14 |
| 2002/0198859 | A1 * | 12/2002 | Singer et al. ................ 707/1 |
| 2002/0198909 | A1 * | 12/2002 | Huynh et al. .............. 707/513 |
| 2003/0101413 | A1 * | 5/2003 | Klein et al. ................ 715/513 |
| 2004/0073498 | A1 * | 4/2004 | Breen et al. ................. 705/27 |

(Continued)

FOREIGN PATENT DOCUMENTS

GB 2356948 A 11/1999

(Continued)

OTHER PUBLICATIONS

Cornell, "Developing Simple Smart Tags" May 2001 http://msdn.microsoft.com/library/default.asp?url=/library/en-us/dnsmarttag/html/odc_stxml.asp.*

(Continued)

*Primary Examiner*—Adam M Queler
(74) *Attorney, Agent, or Firm*—Fenwick & West LLP

(57) ABSTRACT

A method and system for integrating a digital map system with a source document is disclosed including detecting a location description in the source document, and replacing the detected location description with a hyperlink linking to a depiction of the location description. Another embodiment may include a method and system for integrating a digital map system with a source document including detecting a location description in a source document, verifying that the location description describes an actual location, and integrating a hyperlink linking a depiction of the location description into the source document.

28 Claims, 14 Drawing Sheets

U.S. PATENT DOCUMENTS

2005/0096991 A1* 5/2005 Main et al. .................... 705/22

FOREIGN PATENT DOCUMENTS

| WO | WO 00/41090 | 7/2000 |
|---|---|---|
| WO | WO 02/061627 A2 | 8/2002 |
| WO | WO 02/065331 A2 | 8/2002 |

OTHER PUBLICATIONS

MapQuest.Com Maps, Directions and More, [online], [retrieved on Aug. 1, 2005]. Retrieved from the Internet <URL: http://www.mapquest.com>.

Yahoo! Maps, Driving Directions, and Traffic, [online], [retrieved on Aug. 1, 2005]. Retrieved from the Internet <URL: http://maps.yahoo.com>.

MultiMap.com—Online Maps Everywhere, [online], [retrieved on Aug. 1, 2005]. Retrieved from the Internet <URL: http://multimaps.com>.

whereis.com—Search Australian Maps, [online], [retrieved on Aug. 1, 2005]. Retrieved from the Internet <URL: http://www.whereis.com/whereis/home.jsp>.

TerraServer-USA, [online], [retrieved on Aug. 1, 2005]. Retrieved from the Internet <URL: http://terraserver.homeadvisor.msn.com/>.

NASA World Wind, [online], [retrieved on Aug. 1, 2005]. Retrieved from the Internet <URL: http://worldwind.arc.nasa.gov/>, pp. 1-2.

MSN Maps & Directions, [online], [retrieved on Aug. 1, 2005]. Retrieved from the Internet <URL: <http://maps.msn.com/(oqxuearj4ya5au55fogcdzbt)/Home.aspx>.

Dragan, Richard V., MSN Virtual Earth 1.0, MSN Virtual Earth 1.0 review by PC Magazine, Jul. 26, 2005, [online], [retrieved on Aug. 1, 2005]. Retrieved from the Internet <URL: http://www.pcmag.com/article2/0,1895,1840750,00.asp>, pp. 1-2.

Montalbano, Elizabeth, Microsoft Takes on Google with Virtual Earth, IDG News Service, Jul. 25, 2005, [online], [retrieved on Aug. 1, 2005]. Retrieved from the Internet <URL: http://www.infoworld.com/article/05/07/25/HNmsvirtualearth_1.html>.

MSN Virtual Earth To Take On Google Earth, [online], [retrieved on Aug. 1, 2005]. Retrieved from the Internet <URL: http://blog.searchenginewatch.com/blog/050523-125208>, pp. 1-4.

Crawford, Clayton, et al., Fast 3D Visualization of Large Image Datasets in a GIS, Earth Observation Magazine, vol. 12, No. 9, Dec. 2003, USA, pp. 1-5.

MSN Virtual Earth—Microsoft Internet Explorer, [online], [retrieved on Aug. 1, 2005]. Retrieved from the Internet URL:http://virtualearth.msn.com, pp. 1-3.

PCT International Search Report and Written Opinion; PCT/US04/39554, Sep. 20, 2005, 6 pages.

Egnor, Daniel, Geographic Search [online]. [Retrieved on Jun. 20, 2006] Retrieved from the Internet: <http://dan.egnor.name/google.html>.

Egnor, Daniel, Development: geocoder/README [online]. [Retrieved on Jun. 20, 2006] Retrieved from the Internet: <http://cvs.ofb.net/geocoder/README?rev=HEAD&content-type=text/vnd.viewcvs-markup>.

Development: geocoder [online]. [Retrieved on Jun. 20, 2006] Retrieved from the Internet: <http://cvs.ofb.net/geocoder/>.

Yahoo Search Directory [online]. [Retrieved on Jun. 20, 2006] Retrieved from the Internet: <http://dir.yahoo.com/Regional/>.

GeoURL 2.0-beta [online]. [Retrieved on Jun. 20, 2006] Retrieved from the Internet: <http://geourl.org/.

Geotags [online]. [Retrieved on Jun. 20, 2006] Retrieved from the Internet: <http://geotags.com/>.

Northern Light Group, LLC, [online]. [Retrieved on Jun. 20, 2006] Retrieved from the Internet: <http://www.northernlight.com/>.

Mapquest; Retrieved from the Internet: http://www.mapquest.com [retrieved on Apr. 20, 2001], pp. 1-9.

Chinese Office Action, Chinese Application No. 200480034374.X, Mar. 1, 2008, 8 pages.

European Examination Report, EP 04812135.4, Nov. 16, 2007, 4 pages.

Summons to Attend Oral Proceedings Pursuant to Rule 115(1) EPC, European Patent Application No. 04812135.4, Sep. 6, 2008, 8 pages.

Second Chinese Office Action, Chinese Patent Application No. 200480034374.X, Aug. 1, 2008, 18 Pages.

Third Office Action of China State Intellectual Property Office, Chinese Patent Application No. 200480034374.X, May 15, 2009, 18 Pages.

Fourth Office Action of China State Intellectual Property Office, Chinese Patent Application No. 200480034374.X, Sep. 4, 2009, 16 Pages.

Examiner's first report on Australian patent application No. 2004294203, Jan. 15, 2009, 3 Pages.

Final Office Action of China State Intellectual Property Office, Chinese Patent Application No. 200480034374.X, Mar. 10, 2010, 19 Pages.

* cited by examiner

105

Enter Location:

Address or Intersection:

745 Slater Dr.

City:

Sparks

State:     Zip/Postal Code:

NV     55689

REQUEST MAP    215

**Results for *Pizza* in *Smalltown, CA*:**

Frank's Pizza and Pasta
45 Willow Rd.  605
Smalltown, CA 92601

Luigi's Pizzeria
810 Lakewood Dr.  610
Smalltown, CA 92601

The Pizza Shack
280 Main St.  615
Smalltown, CA 92601

600

SYSTEM FOR AUTOMATICALLY INTEGRATING A DIGITAL MAP SYSTEM

CROSS-REFERENCE TO RELATED APPLICATIONS

This application claims priority to U.S. Provisional Patent Application No. 60/525,420, filed Nov. 25, 2003, which is incorporated herein by reference.

BACKGROUND

1. Field of the Invention

The present invention relates generally to digital map systems and more particularly to integrating a digital map system in a distributed network environment.

2. Related Art

Digital map systems are among personal computing's most popular offerings, yet integrating such a system with a website on the World Wide Web requires a conscious effort of the website's author and sometimes even the payment of license fees for use of a digital map system. As a result, many websites leave the end-user with the cumbersome task of manually launching a preferred digital map system and manually cutting-and-pasting an address into the appropriate input fields of the digital map system. Even when a website author has performed the integration work, the resulting maps will be presented by the digital map system chosen by the website author, which may or may not coincide with the end-user's preference.

FIGS. 1-3 provide an example of the limitations of the art. FIG. 1 illustrates a webpage 100 displayed on a web browser 105. The webpage 100 displays a location description 110 for the ACME Corporate Headquarters. If the user desires a map and/or driving directions to the location 110, the user must launch a mapping service through typing in the map service domain name, searching for a mapping service, or by selecting a mapping service that is stored as a favorite.

A mapping service webpage 210 launched by the user is illustrated in FIG. 2. The browser 105 shows that the user has typed in or cut-and-pasted the details of the location description 110 into the mapping service web page 210. The user then selects a request map button 215 to request a map of the location description. Finally, as shown in FIG. 3, a map 310 of the location description 110 is provided in a map webpage 300.

It is desirable to address these limitations.

BRIEF SUMMARY

A method of integrating a digital map system with a source document is disclosed including detecting a location description in the source document and replacing the detected location description with a hyperlink linking to a depiction of the location description.

BRIEF DESCRIPTION OF THE DRAWINGS

FIG. 2 illustrates a mapping service webpage launched by the user.

DETAILED DESCRIPTION

Various aspects of the disclosure are described herein in the context of an apparatus, system, and method for integrating a digital map system. Those of ordinary skill in the art will realize that the following description is illustrative only and not in any way limiting. Other aspects will readily suggest themselves to such skilled persons having the benefit of this disclosure. For example, any number of computer programming languages, such as the Java language, C, C++, Perl, Pascal, Smalltalk, FORTRAN, assembly language, HTML, etc., may be used. Further, various programming approaches such as procedural, object oriented or artificial intelligence techniques may be employed, depending on the requirements of each particular implementation.

The same reference numbers will be used throughout the drawings and the following description to refer to the same or like parts. Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

Figure 4:
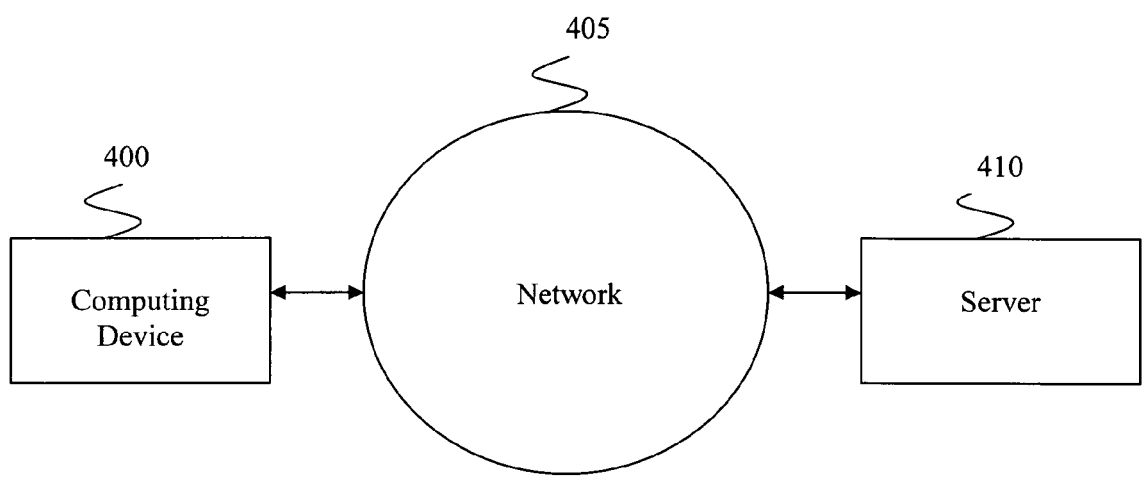
FIG. 4 illustrates a distributed network according to one embodiment.

FIG. 4 illustrates a distributed network according to one embodiment. A computing device 400 is shown connected to a network 405. A server 410 is also connected to the network 405. The computing device 400 may be any type of device configured for computing, such as a personal computer, a mobile phone, a personal digital assistant, a navigation system located in a vehicle, and so on. The server 410 may be any device capable of hosting services over the network 405, such as a network server or a web server. The network 405 may be any type of distributed network, such as a local area network, wide area network, Intranet, Internet or World Wide Web network. Alternatively, the network 405 may be a direct connection between the computing device 400 and the server 410. The computing device 400, network 405 and/or server 410 may be in communication via any type of wired or wireless connection. Moreover, the computing device 400, the server 410, or other computing devices (not shown) and/or other servers (not shown) may be used to perform any or all functions described herein.

Figure 5:
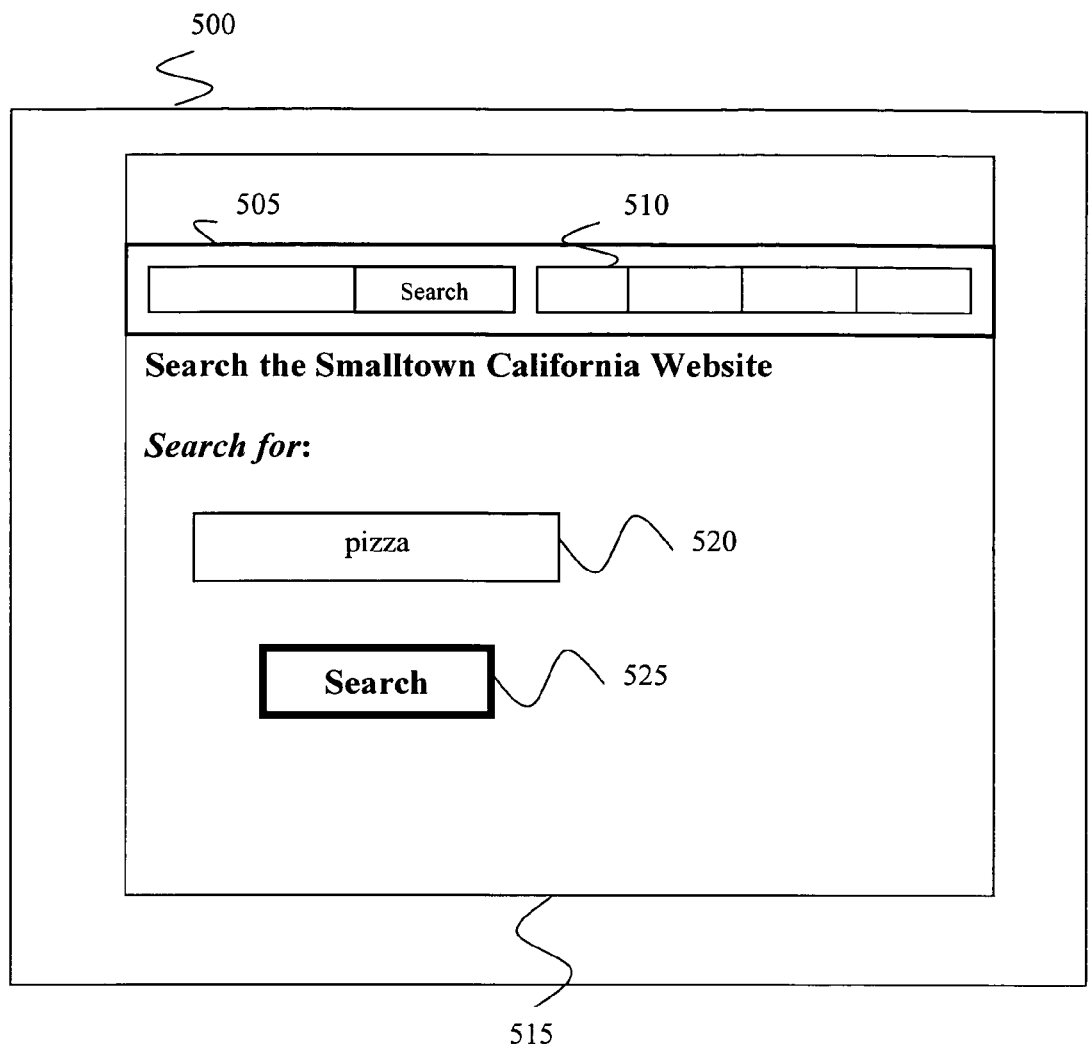
FIG. 5 illustrates a browser that may be displayed on a computing device.

FIG. 5 illustrates a browser 500 that may be displayed on the computing device 400. The browser 500 may be any type of visual display capable of displaying data received from the network 405, such as Microsoft's Internet Explorer browser, Netscape's Navigator browser, PalmSource's Web Browser or any other browsing software capable of communicating with network 405 as is well known in the art. The computing device 400 may also include a browser assistant 505. The browser assistant 505 may include a plug-in, an applet, a dynamic link library (DLL), or a similar executable object or process. Further, the browser assistant 505, which is illustrated as a graphical user interface, may be a toolbar, software button, or menu that provides an extension to the browser 500. Alternatively, the browser assistant 505 may be a part of the browser 500, in which case the browser 500 would implement the functionality of the browser assistant 505.

The browser 500 and/or the browser assistant 505 may act as an intermediary between the user and the computing device 400 and/or the network 405. For example, source documents or other information received from devices connected to the network 405 may be output to the user via the browser 500. Also, both the browser 500 and the browser assistant 505 are capable of performing operations on the received source documents prior to outputting the source documents to the user. Further, the browser 500 and/or the browser assistant 505 may receive user input and transmit the inputted data to the server 410 or other devices connected to the network 405.

By way of example, without limitation, the browser 500 is shown as displaying a source document 515, which was received from the server 410. The source document 515 is illustrated as a search web page for the Smalltown Calif. website. As shown, a user has entered 'pizza' into a search data entry box 520. The user may then select a search button 525, which causes the computing device 400 to request search results for 'pizza' from the server 410 via the network 405.

Figure 6:
FIG. 6 illustrates a visual representation of a search results source document that the server may have generated and transmitted to the computing device in response to the search request.
Figure 6:
Figure 6:

FIG. 6 illustrates a visual representation of a search results source document 600 that the server 410 may have generated and transmitted to the computing device 400 in response to the search request. The search results source document 600 may be a webpage consisting of Hypertext Markup Language (HTML) or any other type of data that the browser 500 and/or browser assistant 505 are capable of interpreting.

Figure 1:
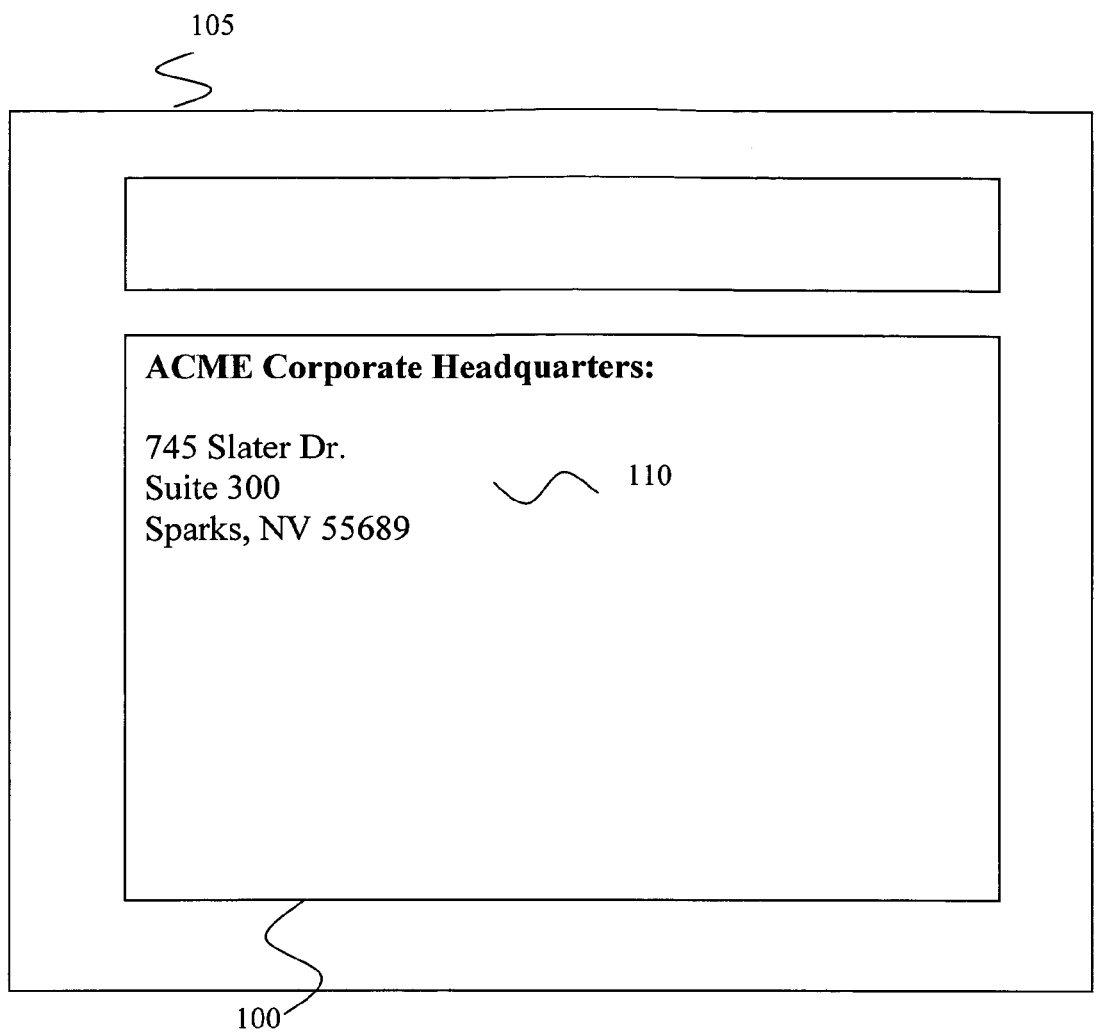
FIG. 1 illustrates a webpage displayed on a web browser.
Figure 3:
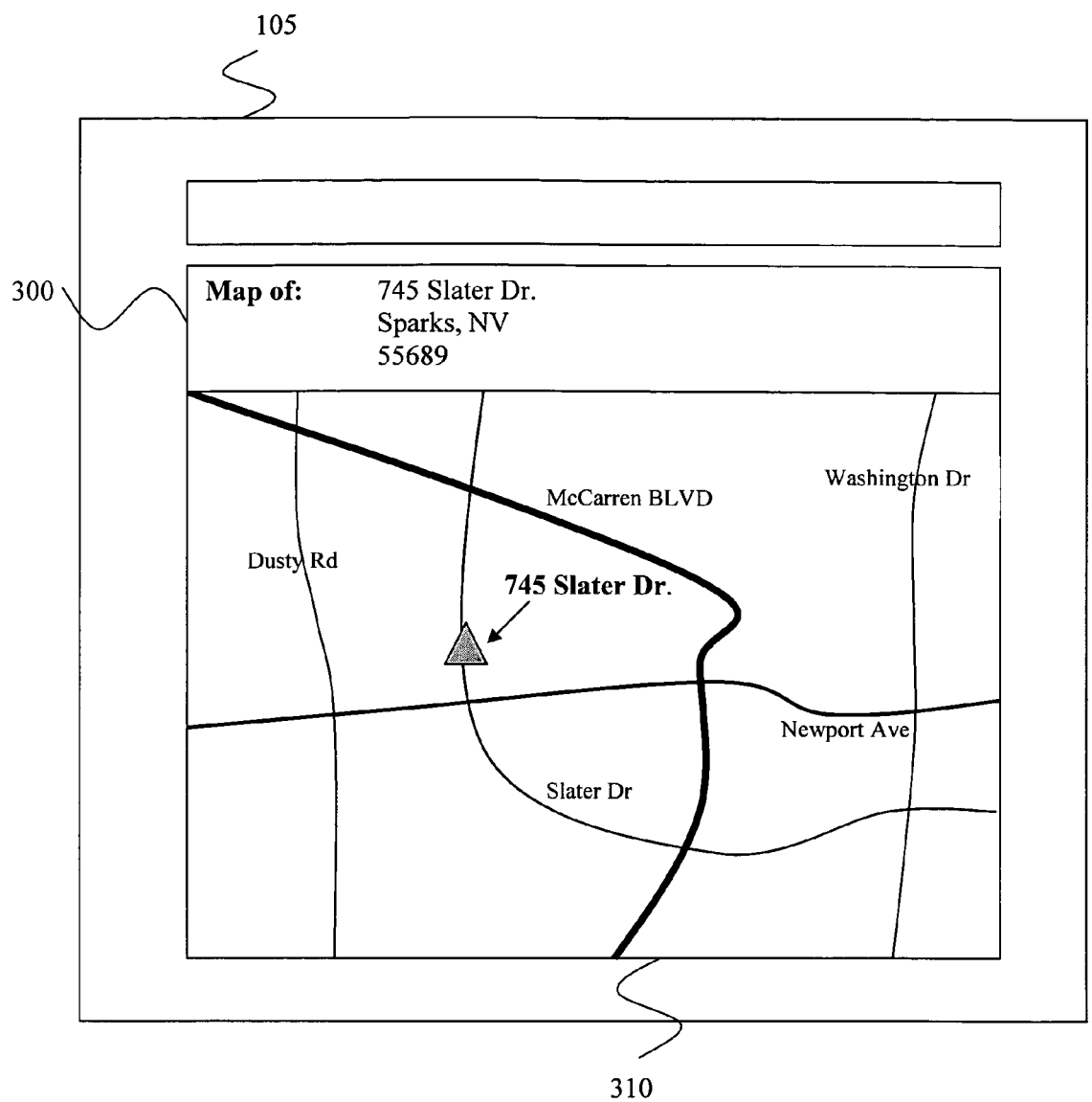
FIG. 3 illustrates a map of a location description that is provided in a map webpage.

The search results source document 600 contains first, second, and third location descriptions 605, 610 and 615, respectively, which contain address information for three pizza restaurant locations. The location descriptions 605, 610, and 615 are shown as postal addresses. But, without limitation, other location descriptions such as telephone numbers, point-of-interest names, airport codes and so on may be used. Moreover, the location descriptions 605, 610, and 615 are shown as United States addresses, however, location descriptions may also refer to addresses or other location descriptions from any other country. Furthermore, any type of source document containing location descriptions may be used, such as, e.g., a web page news article that contains location descriptions, a corporation's web site that contains the corporation's address (e.g., as shown in FIG. 1), a source document for word processing that contains location descriptions and so on.

The following provides an example of how the location descriptions 605, 610 and 615 may be detected as being descriptions of a physical location. Detection may occur by using software and/or hardware to parse the text of the search results source document 600 and to identify location description identifiers within the text that indicate a location description. The browser assistant 505 may perform the detection process in one embodiment. Alternatively, the browser 500 may perform some or all of the detection process. Furthermore, the server 410 may perform the detection process before transmitting the source document to the computing device 400.

By way of example, without limitation, road identifiers such as Rd, Dr, BLVD, Ave, and so on generally indicate that a postal address may be displayed. When a road identifier is detected, a number preceding the road identifier may also be detected as being postal address number. A zip code identifier, such as 92601 may also be detected to indicate a postal address. Further, a two-letter state code identifier, such as CA or NV, preceded by a comma and a city name may be detected. Alternatively, other location description identifiers such as telephone numbers, airport codes, or any other suitable location identifiers may be used to detect location descriptions. One or more of the location description identifiers may be used to detect a potential location description. Alternatively, a confidence identifier may be assigned to a detected location description based on how many location description identifiers are found.

Many commercially available systems and algorithms may be used to parse whole or partial postal addresses from text documents. Likewise, many commercially available optical character recognition systems can convert images with text into a text file for location description detection. See, for example, U.S. patent application Ser. Nos. 10/664,902 and 10/665,359, commonly assigned to Google, Inc, which are incorporated herein by reference. Such systems may be used to detect the location descriptions 605, 610, and 615.

When the computing device 405 receives the search results source document 600 via the network 405, the browser assistant 505 may intercept the source document 600 to parse the text prior to outputting the search results source document 600 to the user. The browser assistant 505 then detects the location descriptions 605, 610, and 615 using the techniques described above. Moreover, the browser assistant 505 may assign a high confidence identifier to each location description 605, 610, and 615 given that each location description contains a street name, a street number, a city name, a state, and a zipcode.

The browser assistant 505 may then create a hyperlink based on the detected location descriptions. As is well-known in the art, a hyperlink is an element that may be located in an electronic source document that links to another location within the source document or to another source document altogether. For example, a first webpage may contain a hyperlink that links to a second web page. A hyperlink generally contains a hyperlink description together with underlying code that, when the hyperlink is selected, causes the browser 500 to display another location within the document or to display another source document. Further, hyperlinks are usually highlighted in some fashion so as to differentiate the hyperlink from general text, such as by underlining, bolding, italicizing, displaying in a different color or font, and/or displaying in some other differentiating fashion.

By way of example, and not by limitation, an HTML hyperlink may take the following generic form:

<a href="DESIRED WEBPAGE">HYPERLINK DESCRIPTION</a>

The DESIRED WEBPAGE may be any webpage or website that the hyperlink links to, however, this information is not generally displayed in the browser 500. The HYPERLINK DESCRIPTION is the portion of the hyperlink that is generally displayed in the browser 500, usually in some highlighted fashion so that the user is aware that the hyperlink description is a hyperlink and not just ordinary text. When the HYPERLINK DESCRIPTION is selected in the source document, the browser is linked to the DESIRED WEBPAGE. As one of ordinary skill in the art is aware, many other features and options may be added to the hyperlink.

The browser assistant 505 may create a hyperlink of the detected location description 605 as follows. As described above during the detection process, the location description 605 may be parsed according to different categories of information that are detected, such as, e.g., city, state, zipcode, street name, street number, street type, and so on. Using this detected information, a hyperlink may also be created such that the created hyperlink will link to a depiction of the location description. A possible hyperlink created for the location description 605 may be:

<a href="www.mappingsystem.com/mapcreator?StreetNumber=45&Street=Willow+Rd&City=Smalltown&State=CA&Zipcode=92601"> 45 Willow Rd. Smalltown, Calif. 92601</a>

As discussed above, this hyperlink has a hyperlink description that matches the location description 605. Also, a desired webpage is included that is a part of the www.mappingsystem.com website that includes location information suitable for a depiction of the location description 605. Alternatively, more or less location information may be included in the hyperlink, such as, e.g., only including the street name, street number, and zip code while leaving out the city and state. Alternatively, the browser 500 and/or the server 410 may perform some or all of the hyperlink creation functions.

According to another embodiment, the browser assistant 505 verifies the location descriptions 605, 610, and 615 to determine if each detected location description identifies an actual existing location. The process of verifying whether a location description exists may proceed as follows. The browser assistant 505 may send a candidate location description, such as, e.g., location description 605, from the computing device 400 to a server (not shown) via the network 405. Alternatively, the browser 500 may transmit the candidate location description. The server may then geocode the candidate location description. Geocoding is the process of converting a location description to a geographic location in some structured format.

By way of example, without limitation, geocoding the following location description:
  6939 Bristol Drive
  Berkeley, Calif. 94705
  USA might result in the following location record:
  Latitude: 37.857910
  Longitude: −122.223555
  Street Number: 6936
  Street Name: Bristol
  Street Type: Dr
  City: Berkeley
  State: California
  County: Alameda
  Country: USA
  Zip+4: 94705-1705

If a location record is provided based on the candidate location description, the candidate location description is verified as existing. The server confirms to computing device 400 (and the browser assistant 505 and/or the browser 500) that the candidate location description exists via the network 405. If a location record is not returned, the candidate location description is identified as not existing. Alternatively, the verification process may provide geographic location information, such as latitude and longitude numbers, for inclusion in a hyperlink.

Many systems capable of geocoding postal addresses are commercially available, such as Sagent's AddressBroker and Telcontar's Drill Down Server. These systems may also be used with commercially available point-of-interest databases (such as Navigation Technologies' Navtech POI data), a reverse look-up telephone number database (such as InfoUSA's business or residential databases or Acxiom's Infobase data) and a postal address standardization system, such as Semaphore Corporation's Zip+4. Alternatively, as one of ordinary skill in the art will recognize, the verification process may be implemented in whole or in part by the computing device 400 and/or the server 410. Furthermore, a different server such as the user's Internet Service Provider's server may perform some or all of the verification process.

In another embodiment, a confidence identifier associated with a candidate location description may be sent to the server for verification. A hyperlink of any location description with a high confidence may be output before verification is complete. But if a candidate location description has a low confidence, a hyperlink may not be output until verification is finished. Moreover, verification may be performed on the low confidence candidate first. If a candidate with a low confidence identifier is verified as being an existing location description, a hyperlink is created and output to the user. Any candidates with a high confidence identifier may be held for verification after the low confidence candidates are verified. If a candidate with a high confidence identifier turns out to not be an existing location description, the hyperlink that was previously created may not be output to the user.

In the present example, the browser assistant 505 received verification that the location descriptions 605 and 615 describe actual locations, however, verification was not received for the location description 610.

Figure 7:
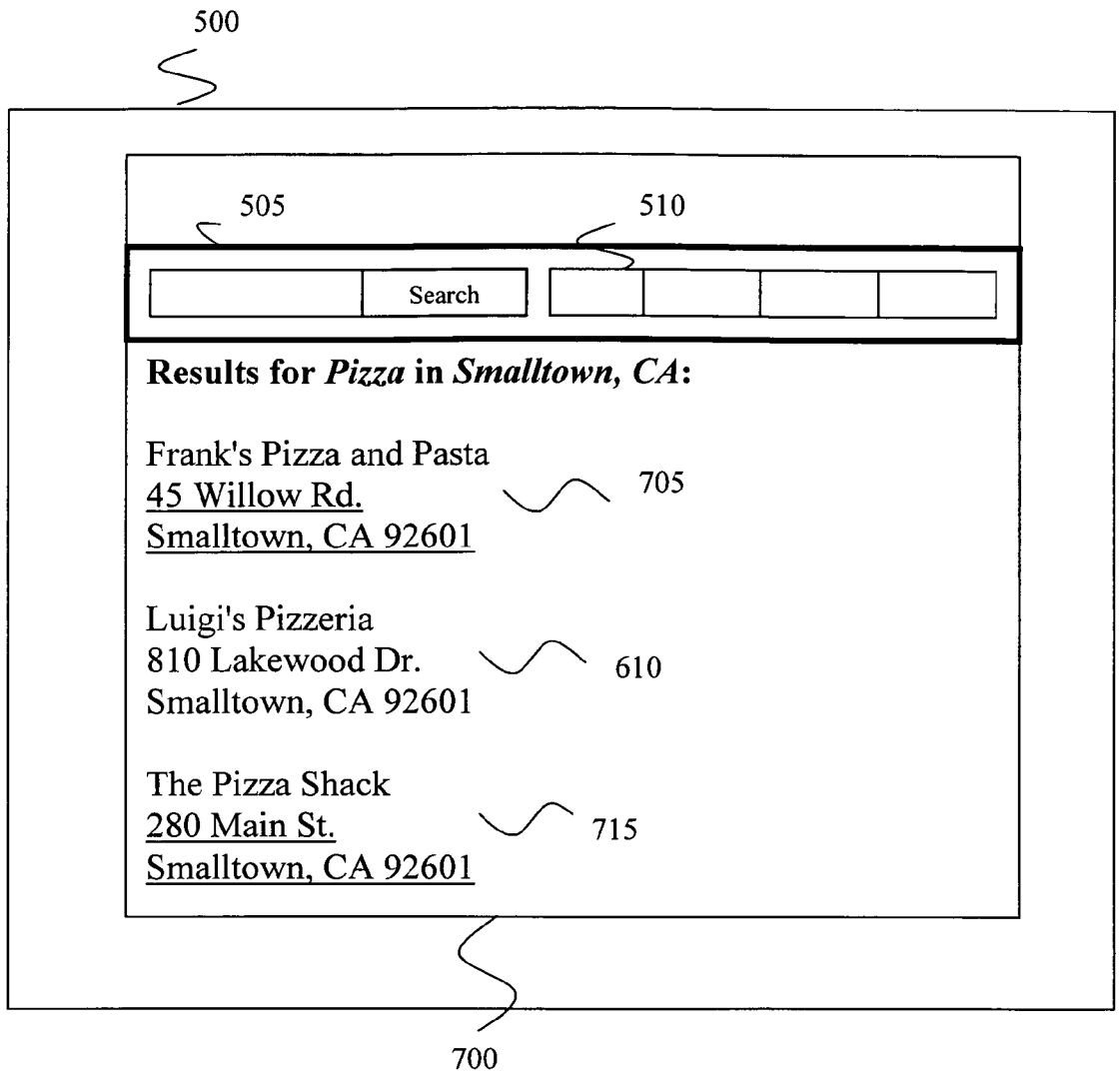
FIG. 7 illustrates an integrated digital map system webpage that is output to the user.

FIG. 7 illustrates an integrated digital map system webpage 700 that is output to the user. As shown, the integrated digital map system webpage 700 is output after the browser assistant 505 detected the location descriptions 605, 610 and 615 and integrated a hyperlink for the location descriptions that were verified as describing actual locations. For instance, the browser assistant 505 has replaced the first location description 605 of the search results source document 600 with a first hyperlink 705 for Frank's Pizza and Pasta. The first hyperlink 705 links to a depiction of the first location description 605. The second location description 610 for Luigi's Pizzeria, however, has remained unchanged because it has not been verified as an existing address. Finally, the browser assistant 505 has replaced the third location description 615 with a second hyperlink 715 for The Pizza Shack. The second hyperlink 715 links to a depiction of the third location description 615.

The user is now able to select the first hyperlink 705 or the second hyperlink 715 from the integrated digital map system webpage 700 to access a depiction of the selected location description. The first and second hyperlinks 705 and 715 are shown as having underlined text, but, as discussed previously, other types of hyperlink displays are possible. Alternatively, the location descriptions 605 and 615 may remain unchanged and hyperlinks 705 and/or 715 may be provided in the form of a menu or drop-down box control instead of an underlined hyperlink to allow the user to choose different types of depictions based on the detected location description, such as providing a map of a location description or travel directions to or from the location description. Furthermore, the created hyperlink(s) may be integrated in the form of a menu in the browser 500 or in the browser assistant 505 that allows a user to select actions on all detected location descriptions in a loaded source document, according to another embodiment. For example, a button 510 may contain a menu that includes hyperlinks to travel directions to or from the location descriptions 605 and 615 that were detected in the source document. Such travel directions may be based on a fourth location description (not shown) that is entered by the user, such as, e.g., the user's home or work address, such that a created hyperlink links to travel directions to or from the fourth location description. Alternatively, for example, the button 510 may contain a menu of hyperlinks that link to depictions of the location descriptions 605 and 615 that are detected in the source document.

Figure 8:
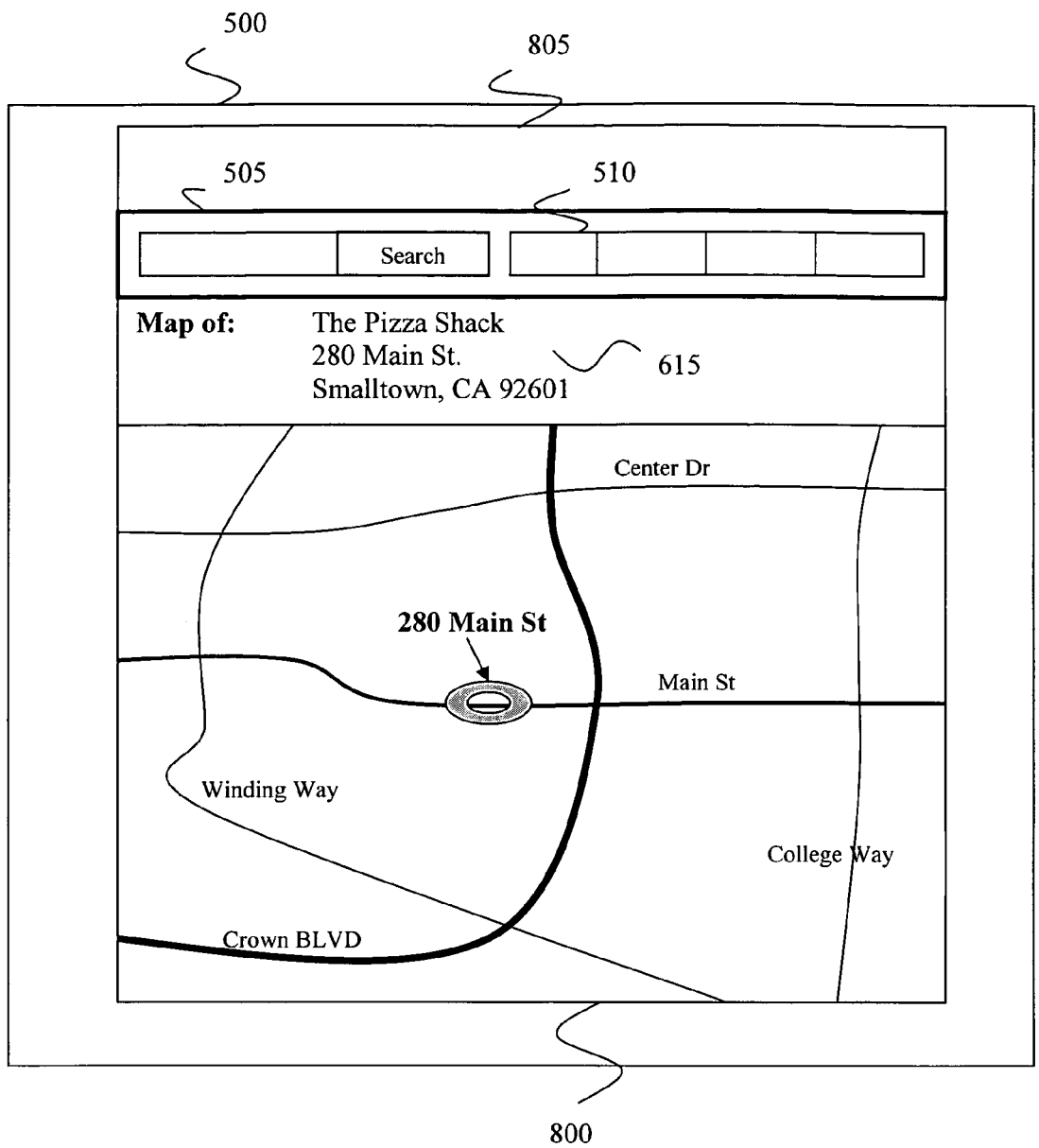
FIG. 8 illustrates a depiction that was linked by a hyperlink.

FIG. 8 illustrates a depiction that was linked by the second hyperlink 715. As shown, the user previously selected the second hyperlink 715 as shown in FIG. 7, which caused the browser 500 to be updated with a depiction 800 of the location description 615. This depiction may have been received via network 405 from a depiction server (not shown). Alternatively, a new browser window (not shown) may be opened with the depiction. The depiction 800 is illustrated as a visual map. Alternatively, the depiction 800 could be provided in other formats, such as a map showing travel directions, a text description of travel directions, or any other textual and/or visual format that includes a depiction of the selected location description. The browser 500 may also be updated with a targeted ad 805 that is targeted to the user based on the selected location description and/or information from the source document that contained the location description. For example, an ad for a restaurant near the location description may be provided. Further, such ads might be pizza restaurant ads due to the source document containing pizza restaurant information. Such ads may be selected based on techniques known by those of ordinary skill in the art.

Figure 9:
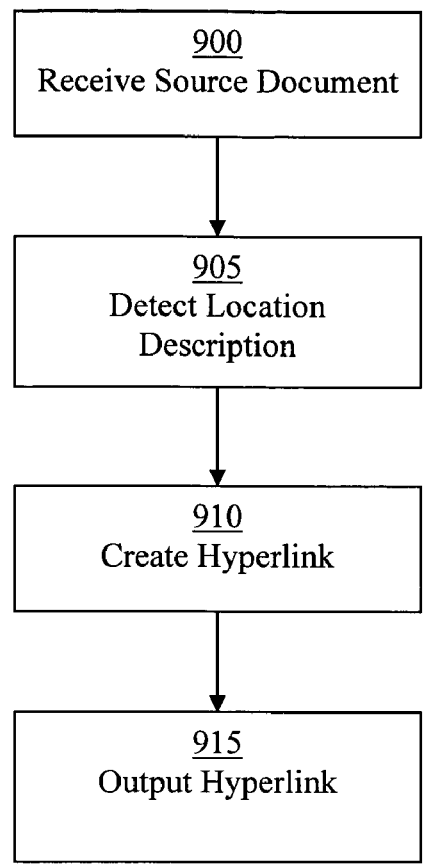
FIG. 9 is a flow chart diagram according to another embodiment.

FIG. 9 is a flow chart diagram according to another embodiment. A source document, is received from the server 410 (block 900). Next, a location description is detected in the source document (block 905). A hyperlink is then created for the location description (block 910) and output with the source document for the end-user (block 915).

Figure 10:
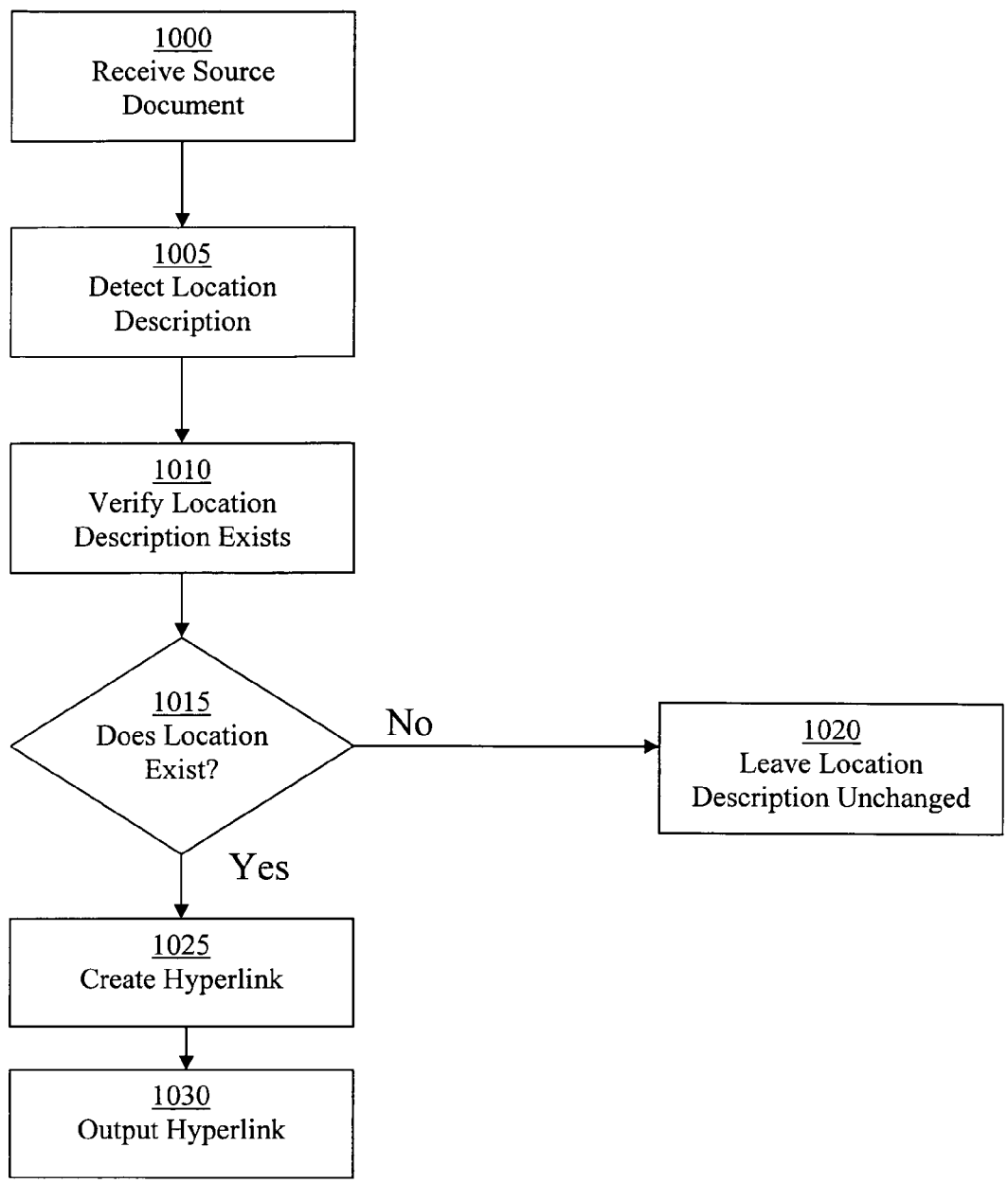
FIG. 10 is another flow chart diagram according to another embodiment.

FIG. 10 is another flow chart diagram according to another embodiment. A source document is received from the server 410 (block 1000), and location description information is detected in the source document (block 1005). The location description is verified so as to determine whether it correctly identifies an actual address (block 1010). The following stage is determined based on whether the location description actually exists (block 1015). If it does not exist, the location description is left unchanged and the source document is output to the user (block 1020). But if the location description does exist, a hyperlink is created for the location description (block 1025) and is output with the source document for the end-user (block 1030).

Figure 11:
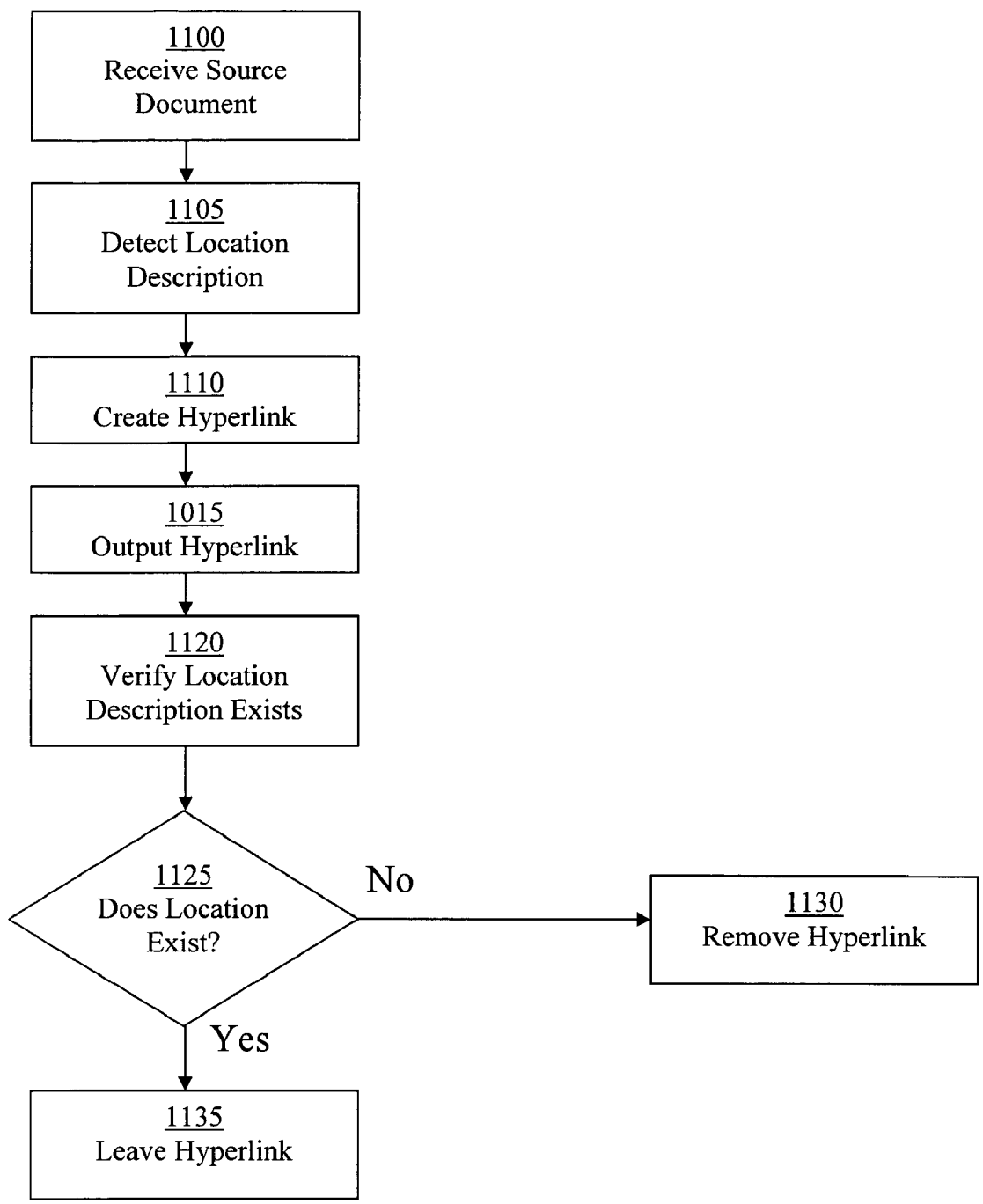
FIG. 11 shows another flow chart diagram according to another embodiment.

FIG. 11 shows another flow chart diagram according to another embodiment. A source document is received (block 1100), and a location description is detected in the source document (block 1105). A hyperlink is also created based on the location description (block 1110). The hyperlink is then output with the source document for the end-user (block 1115). The location description is also verified to determine whether it actually exists (block 1120). A choice is made based on the location description verification (block 1125). If the location does not exist, the hyperlink is removed (block 1130). If the location description does exist, the hyperlink remains displayed for the end-user (block 1135).

Figure 12:
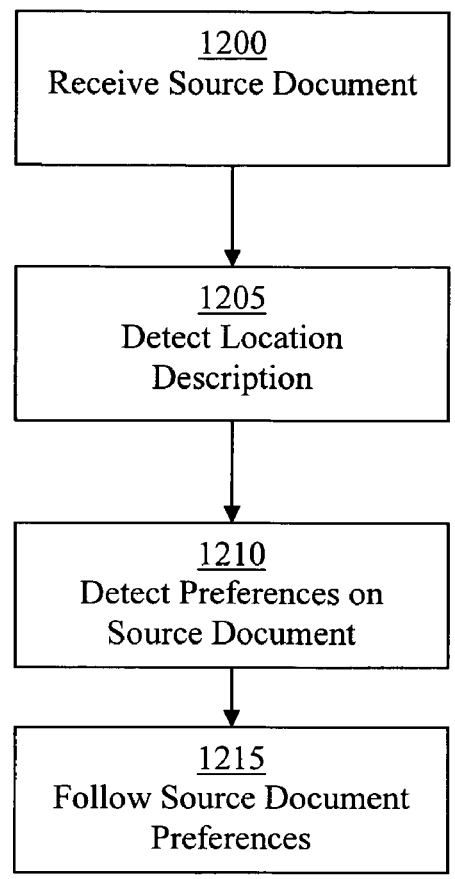
FIG. 12 shows another flow chart diagram according to another embodiment.

In another flow chart diagram according to another embodiment as displayed in FIG. 12, a source document is received (block 1200) and a location description is detected (block 1205). In addition, preferences from the loaded source document are detected (block 1210). Finally, the detected webpage preferences are followed (block 1215).

The detected preferences may be defined by the source document creator, such as a preference to not allow a hyperlink to another map site. Another preference may determine how a mapping service is displayed on the source document creator's source document. Furthermore, other preferences may require that a certain mapping system be used or not be used. Alternatively, the source document creator may designate one or more parts of a source document as location descriptions, optionally supplying the results of geocoding for these locations.

Figure 13:
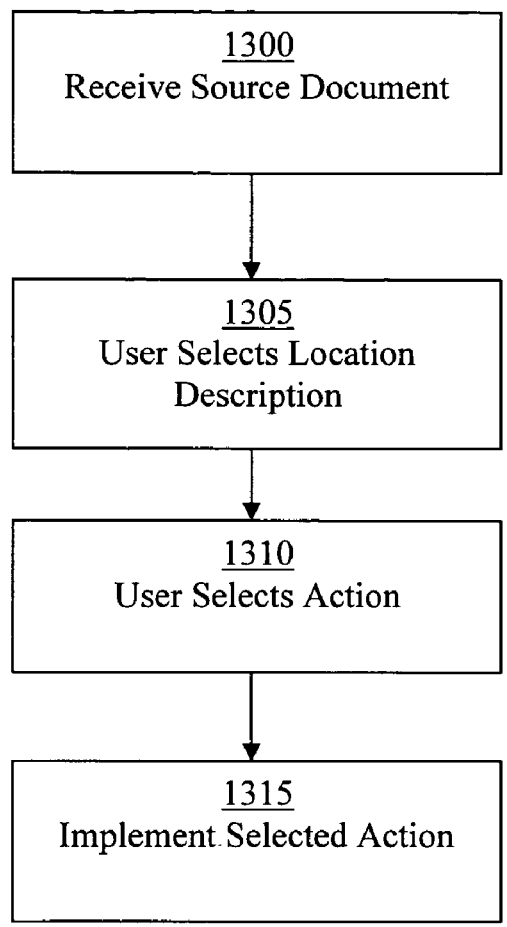
FIG. 13 illustrates a flow chart diagram according to another embodiment.

FIG. 13 illustrates a flow chart diagram according to another embodiment. A source document is received by the computing device 400 and output to the user (block 1300). The user then selects a location description in the source document (block 1305). Such selection can occur by highlighting a location description or any other type of selection, such as by clicking a selection box, keyboard input, trackball input, voice recognition, etc. The user also selects an action based on the selected location description, such as creating travel directions, requesting a depiction of the location description, or any other options (block 1310). The user's selection is then implemented (block 1315).

Figure 14:
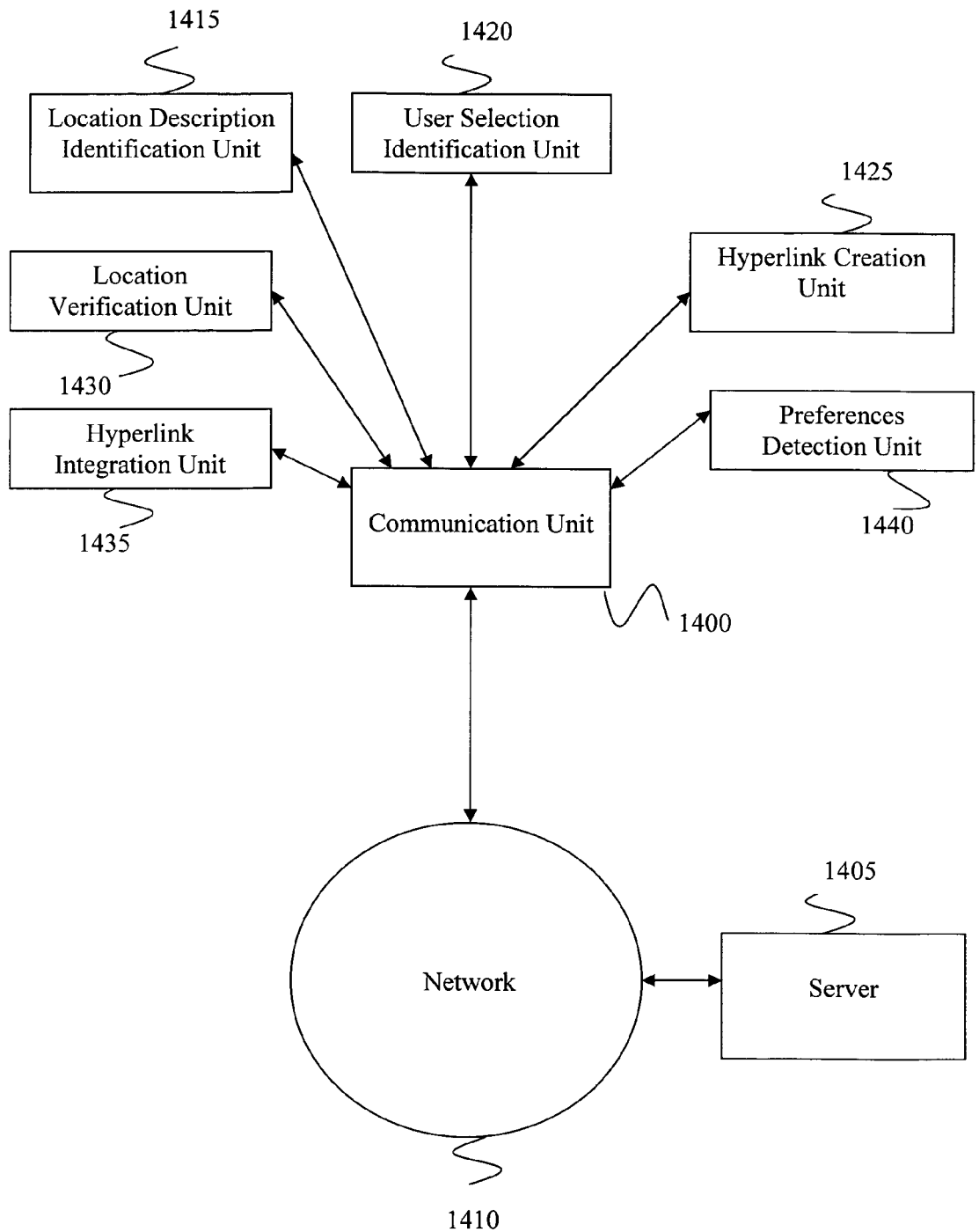
FIG. 14 shows an apparatus according to another embodiment.

FIG. 14 shows an apparatus according to another embodiment. A communication unit 1400 may request a source document from a server 1405 via a network 1410. Alternatively, the network 1410 may be a direct connection between the communication unit 1400 and the server 1405. Once the source document is received by the communication unit 1400, the location description identification unit 1415 reviews the source document to identify any candidate location descriptions. The location description identification unit 1415 may also assign a confidence identifier to any candidate location descriptions. Alternatively, the communication unit 1400 may output the source document to a user and a user selection identification unit 1420 may be used to detect location descriptions in the source document based on the user's selection of location descriptions.

A hyperlink creation unit 1425 receives any detected location descriptions and creates a hyperlink linking to a depiction of the detected location descriptions. Alternatively, the hyperlink creation unit 1425 may only create a hyperlink if the confidence identifier is high. A location verification unit 1430 receives any detected location description and verifies whether the detected location descriptions actually exist. A hyperlink integration unit 1435 receives the created hyperlinks and integrates the created hyperlinks into the source document for output to the user. If the location verification unit 1430 verifies that a detected location description does not exist, the hyperlink integration unit 1435 may determine not to output a created hyperlink of the invalid location description. Alternatively, the hyperlink integration unit 1435 may remove a hyperlink that was already output if the location verification unit 1430 does not verify that a location exists. Moreover, a preferences detection unit 1440 may be used to receive the source document and to detect and implement preferences detected in the source document. If a user selects an integrated hyperlink, the communication unit 1400 may issue a request for a depiction of the selected location description from the network 1410 according to the created hyperlink. The requested depiction may be in the form of a map of the location description, travel directions to or from the location directions, and/or a textual description of the location description.

As will be recognized by one of ordinary skill in the art, the connections between the components illustrated in FIG. 14 may be any kind of wired or wireless connection, software running on a processor, and/or dedicated hardware. Moreover, the communication between the units 1400, 1415, 1420, 1425, 1430, 1435, or 1440 may occur as illustrated in FIG. 14 or, alternatively, directly from one unit to another, such as, e.g., from location description identification unit 1415 to location verification unit 1430. Furthermore, communication between two units may occur indirectly through a different unit, as will be recognized by one of ordinary skill in the art.

In another embodiment, an electronic archive may contain an archive of a portion of a network, such as a portion of the World Wide Web. The archive may be created by crawling the network. A database may also be created by detecting location descriptions in source documents in the archive and/or verifying that the detected location descriptions exist. Techniques for detection and verification of the location descriptions may be the same as described previously. An archive computing device, such as a server or other computing device, may contain the archive database. Alternatively, the archive computing device may contain the archive. The computing device 400 may transmit a resource locator associated with a source document, such as the search results source document 600, to the archive computing device (not shown) via the network 405. For example, the transmitted resource locator may be a Uniform Resource Locator (URL), such as http:// www.website.com. The archive computing device receives the resource locator and then uses the database to identify and/or verify location descriptions in the associated source document. The results are then transmitted back to the computing device 400. Alternatively, a server, such as an Internet Service Provider server, may receive a resource locator from the computing device 400 and transmit the resource locator to the archive computing device to detect and/or verify location descriptions in the source document associated with the resource locator. In another embodiment, the browser assistant 505 and/or the browser 500 transmit the resource locator associated with a source document to another server (not shown) for location description detection, verification, and/or hyperlink creation.

One of ordinary skill in the art will also recognize other possible embodiments. For example, the software code to implement the flow diagrams in FIGS. 9 through 14 may be implemented directly in a web browser, such as Microsoft's Internet Explorer or Netscape's Navigator. Alternatively, such software code may be provided in a graphical user interface application, such as browser assistant 505, that can be integrated with a user's existing web browser. Moreover, the server 410 may contain such software code. Furthermore, a software and hardware combination may be used to implement the flow diagrams. Alternatively, such a system may be implemented with a system that automatically assigns geographic locations to web pages, such as that disclosed in U.S. Provisional Patent Application No. 60/525,400, which is incorporated herein by reference.

Another embodiment may provide a button for turning on the automatic detection of location descriptions and generation of hyperlinks according to the user's desires, such as a button provided in the browser assistant 505. Another button may allow the user to turn off the verification of location descriptions. Other options may also be provided via browser 500 or via the browser assistant 505 provided to the end-user. Moreover, the browser assistant 505 may alternatively be an application running on the computing device 400 that is capable of performing the same functions of the browser assistant 505 without being integrated with the browser 500.

Other embodiments may perform the same stages disclosed in FIGS. 9 through 14, albeit in different orders or combinations. For example, the flow chart diagram of FIG. 12 may be implemented at any stage of the flow chart diagrams of FIGS. 9-11 and 13. Another embodiment may perform some or all of the functions of FIGS. 7 and 10-14 after outputting the received source document to the user.

Another embodiment may provide a server (not shown) connected between the computing device 400 and the network 405. The server may perform some or all of the stages in FIGS. 7-14 prior to providing the loaded source document to the computing device 400. For example, without limitation, the server may be an Internet Service Provider server that computing device 400 connects to for internet services. When the computing device 400 requests a webpage, the server may receive the webpage from the server 410 via the network 405. Then, prior to transmitting the webpage to the computing device 400, the server may perform some or all of the stages shown in FIGS. 6-14, such as detecting location descriptions in the webpage, creating a hyperlink linking to a depiction of the location descriptions, providing the hyperlink to the computing device 400, and/or verifying that the location description describes an actual location.

Certain exemplary embodiments have been described and shown in the accompanying drawings. It is to be understood, however, that such embodiments are merely illustrative and not restrictive. Various other modifications will occur to those ordinarily skilled in the art.

What is claimed is:

1. A method for modifying a web page to include a hyperlink to a location depiction, the method performed by a web server system and comprising:

receiving a request from a web browser for a web page;
retrieving the requested web page;

detecting a location description in the web page;

responsive to verifying that the location description matches a location record, replacing the location description with a hyperlink linking to a depiction of the location description; and providing to the web browser for display the webpage including the hyperlink to the depiction of the location description.

2. The method of claim 1 further comprising:

receiving a request for the depiction of the location description; and providing to the web browser for display the depiction of the location description.

3. The method of claim 1, wherein verifying that the location description matches a location record comprises geocoding the location description.

4. The method of claim 1, wherein the depiction of the location comprises a map of the location.

5. The method of claim 1 further comprising creating the hyperlink using a portion of the location record.

6. The method of claim 1 wherein detecting a location description in the web page comprises receiving a selected location description from a user.

7. A computer program product, comprising:

a computer storage medium having computer readable program code embodied therein for controlling a processor to modify a web page at a web server to include a hyperlink to a location depiction, the computer readable program code in the computer program product including:

computer readable program code configured to receive a request from a web browser for a web page;

computer readable program code configured to retrieve the requested web page;

computer readable program code configured to detect a location description in the web page;

computer readable program code, responsive to verifying that the location description matches a location record, to replace the location description with a hyperlink linking to a depiction of the location description; and computer readable program code configured to provide to the web browser for display the webpage including the hyperlink to the depiction of the location description.

8. The computer program product of claim 7 further comprising:

computer readable program code configured to receive a request for the depiction of the location description; and computer readable program code configured to provide to the web browser for display the depiction of the location description.

9. The computer program product of claim 7 wherein the computer readable program code configured to verify that the location description matches a location record comprises computer readable program code configured to geocode the location description.

10. The computer program product of claim 7 wherein the depiction of the location description comprises a map of the location.

11. The computer program product of claim 7 further comprising computer readable program code configured to create the hyperlink using a portion of the location record.

12. The computer program product of claim 7 wherein the computer readable program code configured to detect a location description in the web page comprises computer readable program code configured to receive a selected location description from a user.

13. A method for modifying a web page to include a hyperlink to a location depiction comprising:

receiving an existing web page for display in a web browser;

detecting a location description in the web page;

responsive to verifying that the location description matches a location record, replacing the location description with a hyperlink linking to a depiction of the location description; and displaying the web page in the web browser including the hyperlink to the depiction of the location description.

14. The method of claim 13 further comprising:

receiving a selection of the hyperlink; and displaying in the web browser the depiction of the location description.

15. The method of claim 13 wherein verifying that the location description matches a location record comprises geocoding the location description.

16. The method of claim 13 further comprising:

detecting preferences in the web page; and implementing the preferences.

17. The method of claim 13 wherein the depiction of the location comprises a map of the location.

18. The method of claim 13 further comprising creating the hyperlink using a portion of the location record.

19. The method of claim 13 wherein detecting a location description in the web page comprises receiving a selected location description from a user.

20. The method of claim 13 wherein detecting a location description in a web page and verifying that the location description matches a location record comprises:

transmitting a resource locator associated with the web page to an archive computing device; and receiving location records from the archive computing device.

21. A computer program product, comprising:

a computer storage medium having computer readable program code embodied therein to modify a web page to include a hyperlink to a location depiction, the computer readable program code in the computer program product including:

computer readable program code configured to receive an existing web page for display in a web browser;

computer readable program code configured to detect a location description in the web page;

computer readable program code, responsive to verifying that the location description matches a location record, configured to replace the location description with a hyperlink linking to a depiction of the location description; and computer readable program code configured to display the web page in the web browser including the hyperlink to the depiction of the location description.

22. The computer program product of claim 21 further comprising:

computer readable program code configured to receive a selection of the hyperlink; and computer readable program code configured to display in the web browser the depiction of the location description.

23. The computer program product of claim 21 wherein the computer readable program code configured to verify that the location description matches a location record comprises computer readable program code configured to geocode the location description.

24. The computer program product of claim 21 further comprising:
   computer readable program code configured to detect preferences in the web page; and
   computer readable program code configured to implement the preferences.

25. The computer program product of claim 21 wherein the depiction of the location comprises a map of the location.

26. The computer program product of claim 21 further comprising computer readable program code configured to create the hyperlink using a portion of the location record.

27. The computer program product of claim 21 wherein the computer readable program code configured to detect a location description in the web page comprises computer readable program code configured to receive a selected location description from a user.

28. The computer program product of claim 21 wherein the computer readable program code configured to detect a location description in a web page and to verify that the location description matches a location record comprises:
   computer readable program code configured to transmit a resource locator associated with the web page to an archive computing device; and
   computer readable program code configured to receive location records from the archive computing device.

* * * * *